US010790927B2

(12) United States Patent
Alieiev et al.

(10) Patent No.: US 10,790,927 B2
(45) Date of Patent: Sep. 29, 2020

(54) METHOD FOR DATA COMMUNICATION BETWEEN AT LEAST TWO PARTICIPANTS OF A WIRELESS COMMUNICATION SYSTEM, CORRESPONDING CONTROL UNIT AND TRANSPORTATION VEHICLE EQUIPPED WITH A CONTROL UNIT AND A COMPUTER PROGRAM

(71) Applicant: VOLKSWAGEN AKTIENGESELLSCHAFT, Wolfsburg (DE)

(72) Inventors: Roman Alieiev, Stendal (DE); Guillaume Jornod, Berlin (DE); Andreas Kwoczek, Lehre (DE); Thorsten Hehn, Etting (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/258,914

(22) Filed: Jan. 28, 2019

(65) Prior Publication Data

US 2019/0245647 A1    Aug. 8, 2019

(30) Foreign Application Priority Data

Feb. 7, 2018 (EP) .................................... 18155554

(51) Int. Cl.
   *G01R 31/08*    (2020.01)
   *H04L 1/00*     (2006.01)
   (Continued)

(52) U.S. Cl.
   CPC ......... *H04L 1/0003* (2013.01); *G08G 1/0104* (2013.01); *G08G 1/093* (2013.01);
   (Continued)

(58) Field of Classification Search
   None
   See application file for complete search history.

(56) References Cited

U.S. PATENT DOCUMENTS

| 5,726,984 A | * | 3/1998 | Kubler ................ B60R 16/0231 |
| | | | 370/349 |
| 8,654,822 B2 | | 2/2014 | Kim et al. |

(Continued)

FOREIGN PATENT DOCUMENTS

| DE | 102015207977 A1 | 11/2016 |
| DE | 212015000248 U1 | 5/2017 |

(Continued)

OTHER PUBLICATIONS

Office Action for Korean Patent Application No. 10-2019-0014543; dated Jan. 10, 2020.

(Continued)

*Primary Examiner* — Gerald A Smarth
(74) *Attorney, Agent, or Firm* — Barnes & Thornburg LLP

(57) ABSTRACT

A method for data communication between communication participants including observing the surroundings of the transmitting participant, determining the positon and motion of the communication participants, and estimating the transmission conditions at a later point in time. The solution is based on classifying the data for data communication in different categories, the categories determining susceptibility of the data to transmission errors determining which data is transmitted under good transmission conditions only and which data is be transmitted under rough transmission conditions whereby the transmission station plans the transmission of data in different categories. The method further includes selecting for data transmission at a given time for which the transmission conditions have been estimated so the data to be transmitted is in a category fitting to the (Continued)

estimated transmission conditions based on the categories data, and transmitting the selected data.

16 Claims, 4 Drawing Sheets

(51) Int. Cl.
*H04W 4/02* (2018.01)
*H04W 4/46* (2018.01)
*G08G 1/09* (2006.01)
*G08G 1/00* (2006.01)
*G08G 1/01* (2006.01)

(52) U.S. Cl.
CPC ............ *G08G 1/22* (2013.01); *H04L 1/0017* (2013.01); *H04W 4/027* (2013.01); *H04W 4/46* (2018.02)

(56) References Cited

U.S. PATENT DOCUMENTS

| | | | |
|---|---|---|---|
| 9,672,666 B2 | 6/2017 | Shin et al. | |
| 9,807,566 B2 | 10/2017 | Alieiev et al. | |
| 2002/0010798 A1* | 1/2002 | Ben-Shaul | H04L 67/1021 |
| | | | 709/247 |
| 2010/0226311 A1 | 9/2010 | Yang et al. | |
| 2012/0075118 A1* | 3/2012 | Basir | G06Q 20/06 |
| | | | 340/905 |
| 2013/0218445 A1* | 8/2013 | Basir | G08G 1/00 |
| | | | 701/117 |
| 2014/0365258 A1* | 12/2014 | Vestal | G06Q 10/063114 |
| | | | 705/7.15 |
| 2017/0041760 A1 | 2/2017 | Alieiev et al. | |
| 2018/0220324 A1* | 8/2018 | Hudson | H04B 7/18506 |
| 2019/0213103 A1* | 7/2019 | Morley | G06F 11/3688 |

FOREIGN PATENT DOCUMENTS

| | | |
|---|---|---|
| DE | 102016211894 A1 | 9/2017 |
| DE | 102016106623 A1 | 10/2017 |
| EP | 1494385 A1 | 1/2005 |
| KR | 20090019416 A | 2/2009 |
| KR | 20110112876 A | 10/2011 |
| KR | 101621877 B1 | 5/2016 |

OTHER PUBLICATIONS

Boban et al.; Design aspects for 5G V2X physical layer; IEEE Conference on Standards for Communcations and Networking (CSCN); Oct. 31-Nov. 2, 2016 (abstract only).

Boban et al.; Use Cases, Requirements, and Design Considerations for 5G V2X; German Research Center; arXiv; 1712.01754v1; Dec. 5, 2017.

Srujan; Ultra-wide Band for Vehicle Platooning; Master Thesis; Eindhoven University of Technology; Aug. 2016.

ETSI TS 136 213; LTE; Evolved Universal Terrestrial Radio Access (E-UTRA); Physical layer procedures; 3GPP TS 36.213, version 13.0.0, release 13; May 2016.

* cited by examiner

METHOD FOR DATA COMMUNICATION BETWEEN AT LEAST TWO PARTICIPANTS OF A WIRELESS COMMUNICATION SYSTEM, CORRESPONDING CONTROL UNIT AND TRANSPORTATION VEHICLE EQUIPPED WITH A CONTROL UNIT AND A COMPUTER PROGRAM

PRIORITY CLAIM

This patent application claims priority to European Patent Application No. 18155554.1, filed 7 Feb. 2018, the disclosure of which is incorporated herein by reference in its entirety.

SUMMARY

Illustrative embodiments relate to an improvement in the vehicle-to-vehicle communication (V2V). More particularly, illustrative embodiments relate to an improvement for exchanging messages in the field of autonomous or cooperative driving. Illustrative embodiments further relate to a corresponding control unit, and a transportation vehicle being equipped with such control unit as well as a corresponding computer program.

BRIEF DESCRIPTION OF THE DRAWINGS

An exemplary embodiment is illustrated in the drawings and is explained in more detail below with reference to the figures. In the drawings.

DETAILED DESCRIPTION

Figure 1:
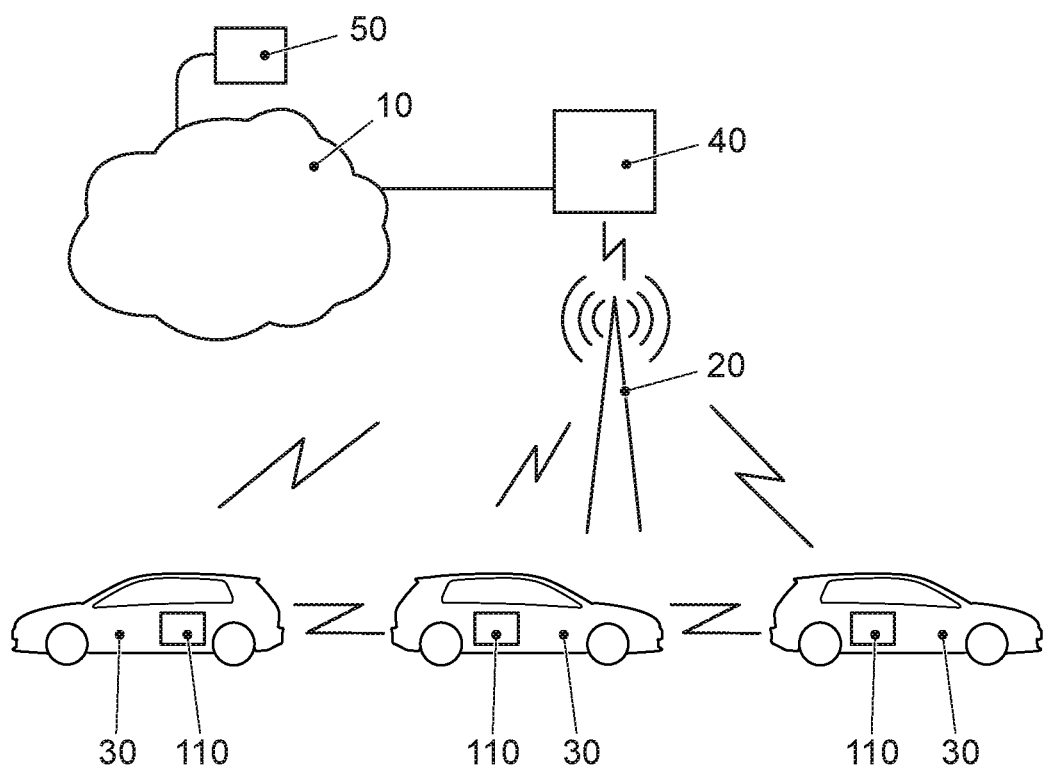
FIG. 1 shows the principle of vehicle-to-vehicle communication via mobile radio communication.

Autonomous driving (sometimes referred to as automatic driving, automated driving or piloted driving) is the movement of transportation vehicles, mobile robots and driverless transport systems which are largely autonomous. There are different degrees of autonomous driving. In this case, autonomous driving is also spoken at certain levels even if a driver is still present in the transportation vehicle, who possibly only takes over the monitoring of the automatic driving operation. In Europe, the various transport ministries (in Germany, the Federal Institute for Road Systems (Bundesanstalt für Straßenwesen) was involved) worked together and defined the following autonomous stages.

Level 0: "Driver only", the driver drives himself, steers, gives gas, brakes, etc. . . .

Level 1: Certain assistance systems help with transportation vehicle operation (including a cruise control system—Automatic Cruise Control ACC).

Level 2: Partial automation. Therein, automatic parking, tracking function, general longitudinal guidance, acceleration, deceleration, etc. are taken over by the assistance systems (including collision avoidance).

Level 3: High automation. The driver does not have to monitor the system continuously. The transportation vehicle independently performs functions such as the triggering of the turn signal, lane change and tracking. The driver can turn to other things, but if requested, the system is requested to take over the lead within a pre-warning period. This form of autonomy is technically feasible on motorways. Legislators are working to allow Level 3 transportation vehicles. The legal framework has already been created.

Level 4: Full automation. The guidance of the transportation vehicle is permanently adopted by the system. If the system is no longer able to handle the tasks, the driver can be asked to take the lead.

Level 5: No driver required. Apart from setting the target and starting the system, no human intervention is required.

Future cooperative driving applications are envisioned to significantly improve efficiency and comfort of automated driving. Increase in cooperation between transportation vehicles pose specific requirements on communication system and the way messages are exchanged among cooperating transportation vehicles.

Usually any vehicular application inherently assumes an error-prone communication channel and dedicates the task of error minimization to lower layers of the ISO/OSI communication model.

Nevertheless, the link-layer performance at any specific time highly depends on the actual communication channel properties which in V2V communications are highly non-stationary. The non-stationarity of the channel mechanisms or methods that its statistical properties, including parameters which define a minimum satisfactory application performance vary over time and space and is different for each transmitter-receiver link. On one side, this results in the fact that in most of the cases the performance of the V2V communication link is underestimated but it may also happen, that the performance of the communication link at some time t might be well below the expected tolerable minimum. For both situations a result is that in many cases the overall efficiency of the communication process and hence also the application stability and functional safety in V2V communications remain below acceptable level. As a consequence, many potentially valued added and safety cooperative functions remain not implemented in existing V2V communications.

There are two basic communication types used for functional interaction between autonomous/cooperative transportation vehicles: point-to-point or unicast and point-to-multipoint or multicast and broadcast. As an example from the first class, such functions as a unicast acknowledgement message about a new group velocity while driving in the platoon can be mentioned. One possible application from the second class is a broadcast alarm message to inform neighboring transportation vehicles about a detected potential for a collision. In both examples, the loss of the message results in undesirable or even dramatic negative effects for the transportation vehicles involved in cooperation.

At the moment, existing approaches to overcome the potential negative link mismatch can be classified into fast and slow link-adaptation methods.

The "fast" algorithms, such as various types of the hybrid automatic repeat request technique HARQ usually rely on an opportunistic attempt of error reduction via an increase in redundancy and repetition of transmitted parity bits. Since the main goal is to achieve an improvement in a very short time, this approach conducts data retransmission in an opportunistic manner without taking into consideration the instant knowledge about actual link properties. Besides an inefficient channel use due to retransmission of data or parity bit information, such methods fail to bring benefit if the actual link condition cannot be sufficiently improved by the simple increase in redundancy. In addition, this approach will not be able to recognize such an unfavorable link state and will attempt even more unsuccessful retransmissions until the maximum number of retransmissions is reached. Such an activity would result in an even further reduction of the end-to-end link efficiency and in an increased application delay. Both of these potential negative impacts are highly undesirable for various mission critical V2V cooperative applications.

On the contrary to the "fast", the so-called "slow" link-adaptation algorithms estimate the actual link quality and take this information into consideration. Nevertheless, since link estimation and adaptation takes time, their reaction takes time and they are not always very efficient in highly varying V2V channels. In addition, such algorithms require feedback from the communicating partners, which is not possible in the case of data broadcast without any feedback messages.

An illustrative example of the possible problem in dynamic V2V cooperative communication for the broadcast case is an impact of time and space varying channel on the received broadcast message by the transportation vehicles involved in cooperative collision avoidance maneuver. Here, due to differences in relative distances and velocities between the sender and all receiving transportation vehicles, the corresponding error rate for each link will be significantly different from each other. Some transportation vehicles may be able to receive the notification of collision alarm without any packed loss whereas other may not receive this notification even after multiple retransmissions. The absence of function-relevant information at some transportation vehicles which are directly involved in the collision avoidance process may even result in a complete failure of the collision avoidance application.

An illustrative example of the possible problem in dynamic V2V cooperative communication for the unicast case is the action of the emergency breaking in the cooperative platoon. Here the platoon leader needs a unicast confirmation from each platoon transportation vehicle about its ability to reduce the current velocity to the requested by the platoon leader level. If at the time of unicast transmission the channel quality is being affected by the high Doppler spread components or by a strong specular reflection with very high Doppler shift from the passing by transportation vehicle or a traffic sign in the vicinity, the unicast message may be lost and the platoon leader will require additional retransmission. Such retransmission may result in an application delay similarly to the described above manner, which in turn may limit such performance parameters of the high density platooning as a minimum distance between platoon members.

DE 10 2015 207 977 A1 describes a method for determining relevancy information which represents the importance of that piece of information in terms of traffic safety in a cooperative driving scenario. This solution offers increased flexibility in terms of the information to be transmitted in the event of a communication channel overload. The solution comprises acquisition of an object property of a first road participant and a second road participant. Further it comprises to determine the relevancy of the object property of the second road participant with regard to the object property of the first road participant. Then the solution comprises an operation of selecting and transferring an object property for data communication to other road participants dependent on the relevancy information.

For the cooperative or autonomous driving, the exchange of certain messages of the transportation vehicles among each other is very important. Such information included in messages may be position information, surroundings information, trajectory information, warning information, control information and more.

From US 2017/0041760 A1 a method for adapting at least one parameter of a communication system is known, wherein at least one subscriber is mobile, in which case a current position of the mobile subscriber is determined at a time and a channel quality for a future time is estimated on the basis of the current position using an environmental model, wherein at least one parameter is changed at the future time on the basis of the estimation. Also disclosed is a corresponding apparatus. Such a parameter is, for example, the transmission power, modulation type or modulation alphabet which indicates how many different symbols can be transmitted. A further example of a parameter is the information rate (also called code rate), for example. Another parameter may be, for example, the adjustment of antenna diversity system. These parameters influence the data rate, latency and reliability of the transmission.

From EP 1 494 385 A1 a method and apparatus for scheduling data transmissions that maximizes data throughput and that uses retransmission information to schedule future transmissions from each user is known. This method and apparatus utilizes a more accurate measure of users' data rates (i.e., their effective data throughput rates) that accounts for the Frame Error Rate (FER) as well as the number of retransmissions when scheduling transmissions from the users. Specifically, to schedule transmissions from a plurality of mobile terminals, a data rate for future transmissions from each of the mobile terminals is calculated. The calculation of this data rate takes into account possible future retransmissions of the packet; it may also include the information about past (re)transmissions. Future transmissions from each mobile terminal are scheduled by prioritizing transmissions from those terminals according to the calculated future data rate.

The disclosure identified different problems with these approaches described above. Since link adaptation takes time, these techniques applied to current transmission conditions are not always very efficient in highly varying V2V channels. The conditions may be obsolete before link adaptation has been performed. In addition, such algorithms require feedback from the communicating partners, which is not possible in the case of data broadcast without any feedback messages.

One challenge with these approaches is that they require extensive message exchange among partners within a very short time over an error prone communication network.

There is therefore a need for an improved approach for a data communication system which avoids the above mentioned drawbacks.

Disclosed embodiments provide a method for data communication between at least two participants of a wireless communication system, a control unit, a transportation vehicle, and a computer program.

The method for data communication between communication participants is based on the idea of trying to adapt the actual communication to basic channel properties via methods of the so-called sensor-based predicted communication technique. More, in particular, the method for data communication comprises the operations of observing the surroundings of the transmitting participant, determining the positon and motion of the communication participants, and estimating the transmission conditions at a later point in time. The solution further includes an operation of classifying the data ready for data transmission in different categories, the categories determining susceptibility of the data to transmission errors. With such an operation it becomes evident which sort of data could be transmitted under good transmission conditions only and which sort of data could also be transmitted under rough transmission conditions and the transmission station can plan the transmission of data in different categories. Furthermore, the proposal comprises the operations of selecting based on the categories data for data transmission at a given point in time for which the transmission conditions have been estimated such that the data to be transmitted is in a category fitting to the estimated transmission conditions, and transmitting the selected data. This means in one example that the data which is classified in the category that it is very susceptible to transmission errors will not be transmitted at transmission times where the channel estimation predicts rough transmission conditions. The used term category does not necessarily mean the strict mapping between the message classes and the channel conditions but rather reflects the dependency between the data requirements and the predicted channel conditions.

The main benefit of the proposed approach is, that it can increase the stability of existing and future mission critical cooperative applications and is based on already available sensor data in the transportation vehicle. Since error-prone transmissions are shifted to time slots where stable transmission conditions exist, falsified transmissions are avoided and that means retransmissions are avoided which subjectively improves the performance of the communication system. In consequence, the application which relies on the communication system as proposed works with greater stability/efficiency. In case of safety relevant applications such as cooperative or autonomous driving, the safety requirements can better be fulfilled.

The solution is suitable to both main types of V2V message exchanges—acknowledged unicast communication mode and non-acknowledged broadcast communication mode. Another benefit is that it can be applied independently or combined with existing approaches used to increase the end-to-end application reliability.

In at least one disclosed embodiment it is beneficial that the data ready for transmission is organized as relations between a data-ready-for-transmission and the corresponding desired communication link quality, which can be dynamically or in a form of a look-up table listing the different categories of data which is stored in the transmit buffer of the transmitting station.

In at least one disclosed embodiment it is beneficial that the operation of estimating the transmission conditions comprises an operation of estimating whether the receiving participant is in line of sight to the transmitting participant, obstructed line of sight or in non-line of sight to the transmitting participant. Since the position and motion of the communication participants is determined anyhow, this information can easily be determined in the transmitting participant. The information helps to increase estimation of the transmission conditions.

In another disclosed embodiment the operation of estimating the transmission conditions comprises at least one of the operations of estimating the relative velocity between at least two participants, estimating at least one of the Doppler frequency shift, delay spread, the power relation of scattered signal reflections from objects in the surroundings of the transmitting participant, estimating the signal travel time for at least the line of sight transmissions between at least two participants and optionally for the relevant signal reflections reaching the receiving participant. Certain techniques of link adaptation rely on the estimated information in this disclosed embodiment.

It is further beneficial if in another disclosed embodiment the method further comprises an operation of checking if the transmission conditions could be improved by link adaptation at the transmitting station. If the link adaptation technique is exhausted and there is no further option to increase robustness of the channel to interferences, then corresponding consequences could be taken.

In a plurality of further disclosed embodiments the operation of link adaptation at the transmitting participant comprises at least one of the techniques hybrid automatic repeat request HARQ, transmit power control, modulation type adaptation, puncturing and antenna diversity, such as multiple input single output MISO and multiple input multiple output MIMO processing at the transmitting station.

In a still further disclosed embodiment, the operation of link adaptation comprises an operation of checking if the transmission conditions could be improved by link adaptation at the receiving station.

For this disclosed embodiment it is beneficial if the operation of link adaptation comprises at least one of the techniques Doppler compensation and antenna diversity, such as multiple input single output MISO and multiple input multiple output MIMO processing at the receiving station.

It is further beneficial for the operation of checking if the transmission conditions could be improved by link adaptation if it is determined if the data to be transmitted in a given category fits to the transmission conditions and if the transmission conditions are rougher than what is appropriate for the given data category, the data transmission is being postponed and optionally a data transmission with data in a category with lower susceptibility to rough transmission conditions is advanced. Such behavior is key for achieving the performance increase of the communication system as indicated above.

Of course, in ideal case, the postponement of the data amounts the time where in the operation of estimating the transmission conditions better transmission conditions are predicted.

Most of the data in different categories comprise time critical data. Such data have certain time constraints. Therefore it is beneficial if in the operation of categorizing data a latency of the data in the respective category is also assigned.

In another disclosed embodiment the maximum allowed postponement of the data corresponds to the latency of the data in the given category. Thereby, the system can limit the postponement of data to the latency time which corresponds to the category. If by such postponement the transmission conditions required for the category cannot be reached, it is one strategy to discard such data from the buffer.

It is also beneficial if in the operation of categorizing data at least the categories unicast acknowledgement message and broadcast alarm message from the field of cooperative or autonomous driving are distinguished. Both data categories will be treated differently in the link adaptation technique.

Corresponding benefits are apparent for a control unit according to the proposal, a corresponding transportation vehicle comprising a control unit according to the proposal and a computer program according to the proposal as claimed.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles, properties, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a way for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited ways are combined and brought together in the manner which the claims call for. It is thus regarded that any way that can provide those functionalities are equivalent to those shown herein.

FIG. 1 shows the principle of vehicle-to-vehicle communication V2V using mobile radio communication. The transportation vehicles are labeled with reference number 30. The term transportation vehicle is to be understood as a collective term for transportation vehicles with an internal combustion engine or an electric motor, whether for bicycles with or without an electric motor or other transportation vehicles powered by muscle, or for transportation vehicles with one, two, four or more wheels. Whether for motorcycles, passenger cars, trucks, buses, agricultural transportation vehicles or construction machines. The list is not exhaustive and includes other transportation vehicle categories.

However, transportation vehicle communication, in particular, transportation vehicle direct communication, is necessary for the fields of cooperative driving maneuvers or autonomous driving. Various systems for transportation vehicle communication are developed. Examples include WLAN-based transportation vehicle communication, also called "ad-hoc domain", and transportation vehicle communication in the field of mobile radio networks. In the case of mobile radio-based technology, however, the base station has to transmit the messages from transportation vehicle to transportation vehicle. This is the area where communication takes place in the so-called "Infrastructure Domain". For the future mobile radio generation, the transportation vehicle direct communication is also made possible. In LTE, according to Long Term Evolution, this option is called LTE-V, in the case of the 5G initiative this option is called D2D.

The transportation vehicles in FIG. 1 are each equipped with a communication module 110, which serves as a transmitting and receiving unit for communication in a mobile radio network. The transportation vehicle 30 here corresponds to a mobile radio network subscriber station because of the integrated communication module 110. All messages from the transportation vehicles (uplink) and to the transportation vehicles (downlink) are routed either via a base station 20 which serves a mobile radio cell or, in the case of direct transportation vehicle communication (Sidelink), directly between the transportation vehicles 30. If the transportation vehicles 30 are within this mobile radio cell, they are registered or logged in at the base station 20. If they leave the mobile cell, they are handed over to the neighboring cell (handover) and accordingly logged off at the base station 20. The base station 20 also provides access to the Internet so that the transportation vehicles 30 or all other mobile radio subscribers are supplied with Internet data in the mobile radio cell. For this purpose, the base station 20 is connected to the EPC 40 (Evolved Packet Core) via the so-called S1 interface. A central computer 50 is also accessible via the Internet 10 or another wide area network WAN. This may be located in a traffic control center to which, e.g., some of the position data or trajectory information of the individual transportation vehicles 30 may be reported for central surveillance or coordination.

Such mobile radio technologies are standardized and reference is made here to the corresponding specifications of mobile radio standards. As a modern example of a mobile radio standard, reference is made to the 3GPP initiative and the LTE standard (Long Term Evolution). Many of the related ETSI specifications are currently available in the version 14. The following is mentioned as an example from version 13: ETSI TS 136 213 V13.0.0 (May 2016); Evolved Universal Terrestrial Radio Access (E-UTRA); Physical layer procedures (3GPP TS 36.213 version 13.0.0 Release 13).

LTE stands for high transmission rates and short response times. The increase in the transmission rate is achieved in LTE by better modulation methods, more flexible frequency usage and larger channel bandwidths. According to the specification, LTE currently has a transmission rate of more than 300 MBit/s in the downlink and 75 MBit/s in the uplink per 20 MHz band, mathematically and less overhead.

The transmission speed of LTE is essentially dependent on the frequency range, the channel width, the distance to the base station 20 and the number of participants within the mobile radio cell. The more users use the bandwidth at the same time, the lower the transmission rate per subscriber.

For the downlink the OFDMA technique (Orthogonal Frequency Division Multiple Access) is used. There, the known multi-carrier transmission technique OFDM (Orthogonal Frequency Division Multiplexing) is used, in which data symbols are modulated onto the individual carriers by QPSK (Quadrature Phase-Shift Keying) or QAM (Quadrature Amplitude Modulation). With OFDMA, the available frequency band is divided into many narrow bands (channels). The bandwidth is used flexibly to extract the utmost in transmission power from the frequencies.

Special algorithms select the appropriate channels, taking into account the influences from the environment. In this case, optionally only the carriers are used for transmission, which are the cheapest for the user at its respective location.

For the uplink the SC-FDMA technique is used (Single Carrier Frequency Division Multiple Access). This is a single-carrier access method which is very similar to OFDMA. SC-FDMA has lower power variations and makes simpler power amplifiers possible. This especially protects the battery of mobile devices.

Sidelink communication also uses uplink communication resources.

Figure 2:
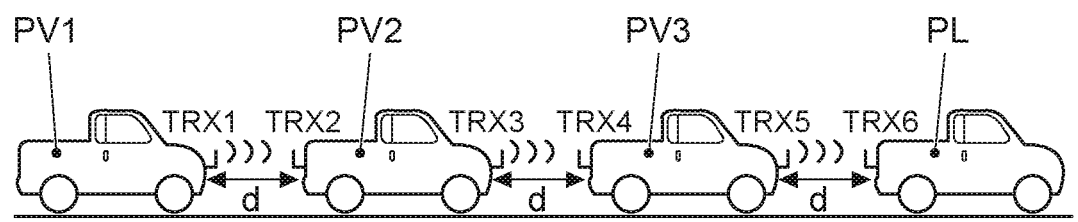
FIG. 2 shows the principle of UWB distance measurements between the transportation vehicles of a platoon.

FIG. 2 shows one prominent example of a cooperative driving maneuver which is called platooning. Platooning refers to intelligent convoy driving as an application, which is also known as "high density platooning". The distances between the transportation vehicles of the convoy are, e.g., trucks adapted to the traffic situation and regulated. The aim is to reduce the distance between the convoy transportation vehicles as much as possible to reduce energy consumption. For this purpose, messages must be constantly exchanged between the convoy transportation vehicles.

In FIG. 2, a transportation vehicle convoy with four transportation vehicles is shown. These are utility transportation vehicles. Typically, these are trucks of appropriate length, which band together to cover a distance together to save energy and protect the environment. The platoon leader transportation vehicle is designated PL, corresponding to "Platoon Leader". The following convoy transportation vehicles are designated PV3 to PV1. All transportation vehicles are equipped with a GNSS receiver corresponding to Global Navigation Satellite System. Examples of a GNSS receiver are a GPS-receiver corresponding to Global Positioning System, Galilei-, GLONASS- and Beidou-receiver. All transportation vehicles of the platoon are equipped with on-board communication mechanisms or methods for direct transportation vehicle communication. Furthermore, it is shown that the transportation vehicles are also equipped with UWB transceivers corresponding to ultra-wide-band transceivers. The transportation vehicles are each equipped with 2 UWB transceivers, once at the front of the transportation vehicle and second at the rear of the transportation vehicle. The transportation vehicles are also equipped with a platoon coordination unit. However, this feature is only activated on the platoon leader transportation vehicle PL.

The use of UWB transceivers for distance measurements in the field of High Density Platooning is described in a master thesis of Eindhoven University of Technology. This master thesis with title "Ultra-wide Band for Vehicle Platooning" is dated August 2016 and the author is A. Srujan.

The transportation vehicles are also equipped with mechanisms or methods for surroundings observation. The sensor system, which is used to capture the environmental objects is based on different measuring methods depending on the application. Widespread technologies are among others Radar corresponding to Radio Detection and Ranging, Lidar corresponding to Light detection and ranging, cameras 2D and 3D and ultrasonic sensors.

Figure 3:
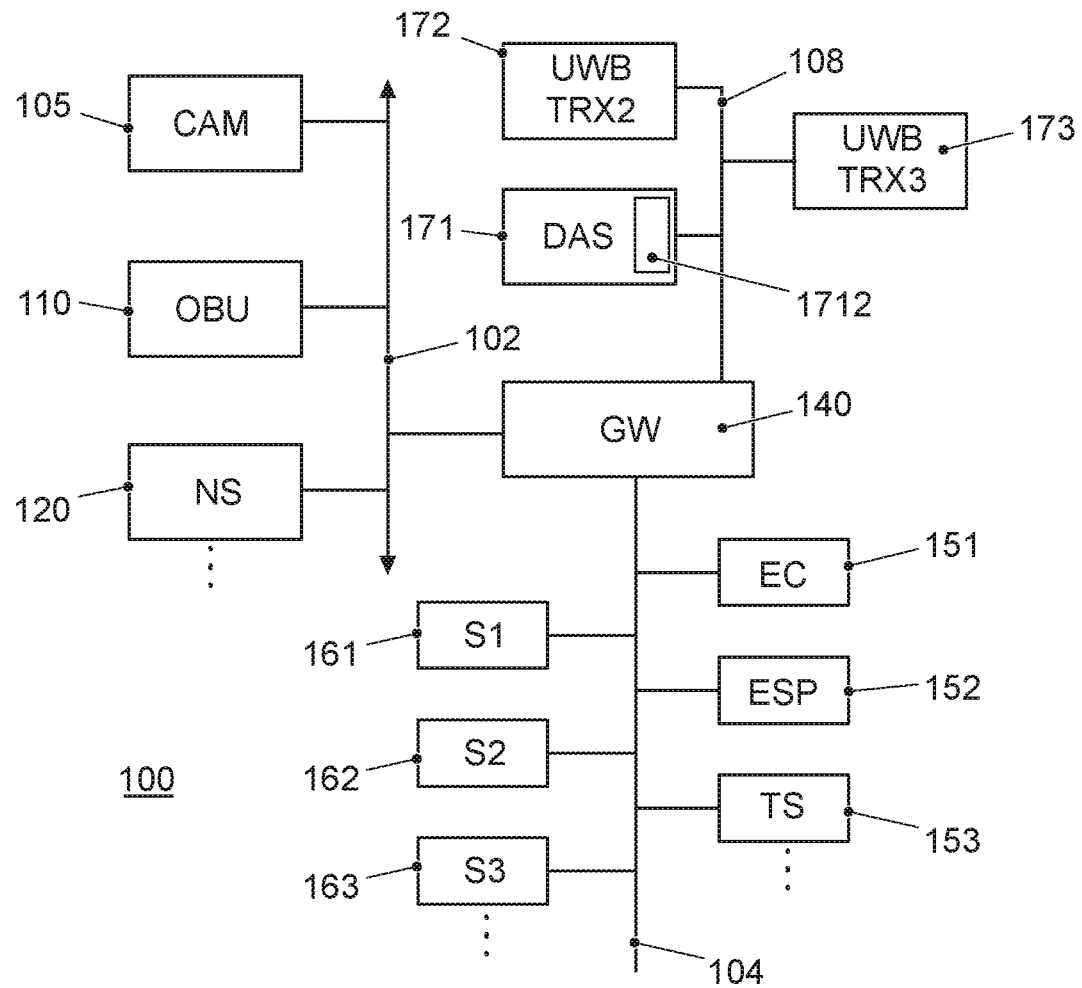
FIG. 3 shows a block diagram for a transportation vehicle communication network with various transportation vehicle electronics components.

FIG. 3 shows the typical construction of an on-board network of a modern transportation vehicle. Reference numeral 151 denotes an engine control unit. The reference numeral 152 corresponds to an ESC control unit corresponding to electronic stability control and the reference numeral 153 denotes a transmission control unit. Further control devices, such as a transportation vehicle dynamics control unit, etc., may be provided in the transportation vehicle. The networking of such control units, all of which are allocated to the category of the drive train, typically occurs with the CAN bus system (controller area network) 104. Since various sensors are installed in the transportation vehicle and these are no longer only connected to individual control units, such sensor data are also distributed via the bus system 104 to the individual control devices. Examples of sensors in the transportation vehicle are wheel speed sensors, steering angle sensors, acceleration sensors, rotary data sensors, tire pressure sensors, distance sensors, knock sensors, air sensor sensors, etc. The various sensors with which the transportation vehicle is equipped are designated by the reference number 161, 162, 163 in FIG. 3.

However, the modern transportation vehicle can also have further components such as video cameras 105, e.g., as a front camera, rear camera or side camera or as a driver monitoring camera, as well as a LIDAR (Light Detection and Ranging) or RADAR (Radio Detection and Ranging) device for the realization of a radar system or for implementing a distance warning or collision warning/avoidance device. Such systems are used more and more in transportation vehicles for surroundings observation. There may be other systems in the transportation vehicle, too such as ultra-sonic distance sensors for surroundings observation. The ultrasonic sensor typically is used for a short distance observation, e.g., 3 to 5 m. The RADAR and LIDAR sensors could be used for scanning a range up to 250 m or 150 m and the cameras cover a range from 30 to 120 m.

A navigation system 120, which is also installed in the area of the cockpit, is often distinguished from this. The route, which is displayed on a map, can of course also be displayed on a display in the cockpit (not shown). Other components, such as a hands-free telephone system, may be present but are not shown in detail. Reference numeral 110 denotes an on-board unit. This on-board unit 110 corresponds to a communication module via which the transportation vehicle can receive and transmit mobile data. Typically, this is a mobile radio communication module, e.g., according to the LTE standard. All these devices are assigned to the infotainment area. They are therefore networked via a bus system 102 designed for the special needs of this device category. A high speed CAN bus is one example, which could be applied.

As a further example, an Ethernet-Bus 108 is shown which connects only the two components driver assistance controller 171 and UWB transceivers 172 and 173. As seen in FIG. 2, each transportation vehicle is equipped with two UWB transceivers, one at the front and another one at the rear end. The Ethernet-Bus is a choice also for this communication bus 108 due to its higher bandwidth for data transport. One Ethernet-Bus adapted to the special needs of car communication is standardized in the IEEE 802.1Q specification. Moreover, a lot of information for surroundings observation may be received via V2V communication from other road participants. Particularly for those road participants not being in line of sight LOS to the observing transportation vehicle it is very beneficial to receive the information about their position and motion via V2V communication.

For the purpose of transmitting the transportation vehicle-relevant sensor data via the communication interface 110 to another transportation vehicle or to a central computer 50, the gateway 140 is provided. This is connected to the different bus systems 102, 104 and 108. The gateway 140 is adapted to convert the data it receives via the Ethernet-Bus 108 to be converted into the transmission format of the infotainment CAN-bus 102 so that it can be distributed in the packets specified there. For the forwarding of this data to the outside, i.e., to another transportation vehicle or to central computer 50, the on-board unit 110 is equipped with the communication interface to receive these data packets and, in turn, to convert them into the transmission format of the correspondingly used mobile radio standard. As shown, the gateway 140 is connected as a central device to the busses 102, 104 as well as 108. It therefore takes all the necessary format conversions if data are to be exchanged between the different bus systems if required.

Under the considered scenario of cooperative or autonomous driving the transportation vehicles broadcast so-called Cooperative Awareness Messages CAM periodically such that they are aware which other transportation vehicles are in the vicinity. Together with its own surroundings observation mechanisms or methods, the observing transportation vehicle is pretty well informed what happens in the near future and can estimate the transmission conditions pretty exact. It is noted, that not every information can be received via the on-board unit 110. There may be objects in the surroundings which are not equipped with V2V communications mechanisms or methods. Such objects may include other transportation vehicles, vulnerable road participants, obstacles and the like.

A problem in surroundings observation and transmission condition estimation in transportation vehicles is the influence of the relative movement between transmitting station and receiving station on the transmission conditions. The Doppler effect causes a frequency shift at the receiving transportation vehicle and is dependent on the frequency range of the transmission. There are solutions available to make the communication systems robust against the Doppler spread. One sophisticated solution for the LTE mobile communication system is described in DE 10 2016 211 894 A1. Here, the relative velocity between transmitting station and receiving station will be estimated and corresponding to the estimated velocity the number of DMRS symbols (de-modulation reference symbol) will be adjusted for transmission of V2V messages. Those DMRS symbols serve as pilot reference symbols. With more DMRS symbols in the transmission frame channel estimation on the receiving side is more accurate such that the receiver can cope better with the Doppler spread. It is expressively referred to the cited reference in terms of the disclosure of the method for Doppler spread compensation in the present disclosure. In at least one disclosed embodiment both stations transmitting station and receiving station will estimate relative velocity and switch to the corresponding DMRS mode correspondingly.

Figure 4:
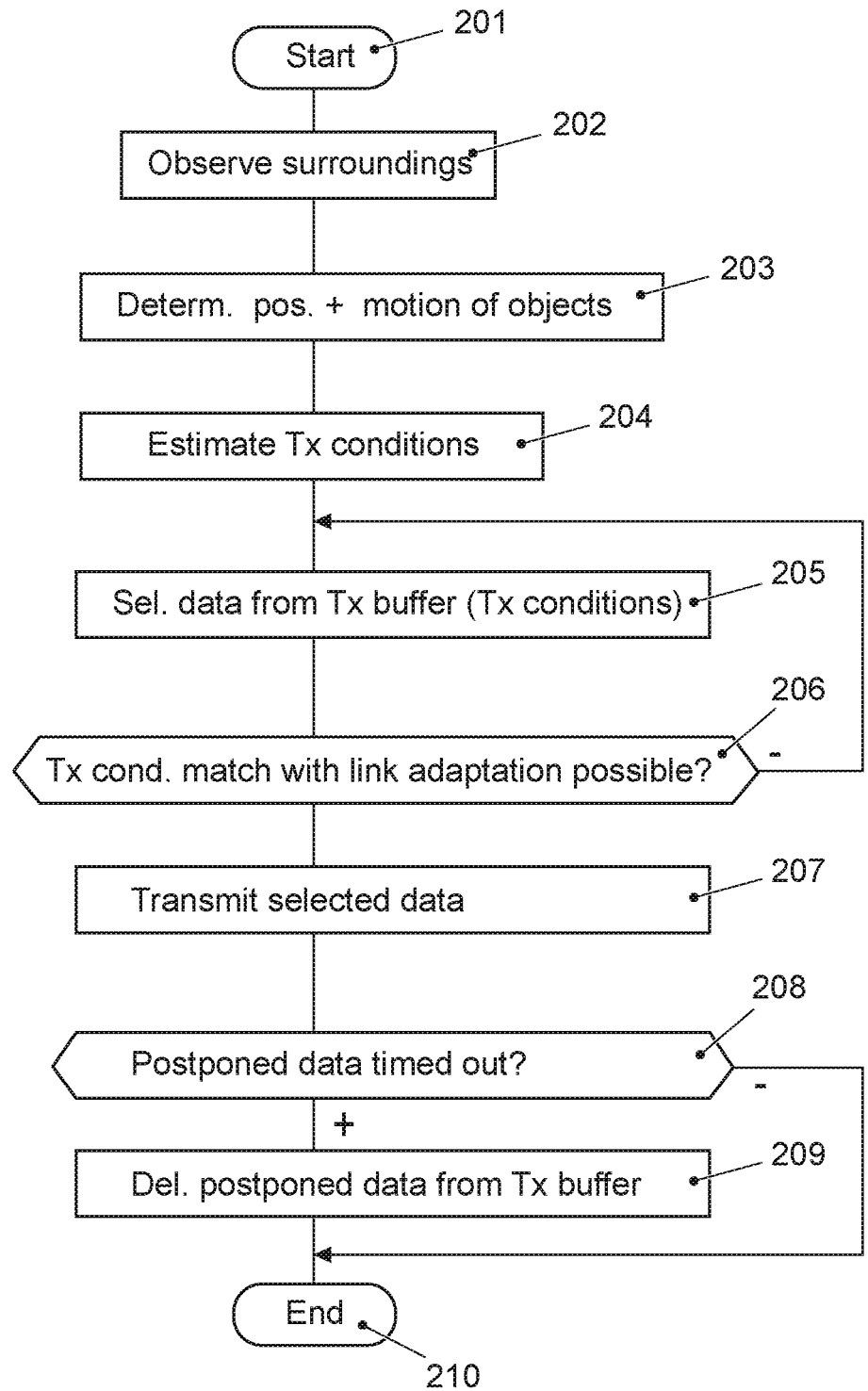
FIG. 4 shows a flow chart of a computer program to be executed in a processing unit of a V2V transmitting participant.

FIG. 4 shows the process being performed in the on-board communication unit 110 of a transmitting participant. This process is being performed, e.g., in each of the platoon transportation vehicles when they want to report a new distance measurement result to the platoon leader transportation vehicle PL. In general it may also be performed when transmitting a CAM message, a cooperative maneuver message like a CACC message corresponding to Cooperative Adaptive Cruise Control or the like. There are further examples of such use cases like Vulnerable Road User message, Traffic Efficiency message or Teleoperated Driving message. These use cases are described in greater detail in the paper "Use Cases, Requirements, and Design Considerations for 5G V2X" of Mate Boban, Apostolos Kousaridas, Konstantinos Manolakis, Joseph Eichinger, Wen Xu of Huawei Technologies, German Research Center, 80992 Munich, Germany.

The method starts in operation at 201. In operation at 202 takes place an operation of surroundings observation. On one hand, this operation includes object recognition by image processing algorithms applied to the images captured by the camera 105. On the other hand it includes evaluation of information having been collected by receiving CAM messages, cooperative sensing messages, vulnerable road user messages and traffic efficiency messages and the like.

In operation at 203 it follows the determination of the position of the surrounding transportation vehicles vulnerable road participants and other objects. Also in this operation the motion of the surrounding transportation vehicles, vulnerable road participants and other objects will be determined. Furthermore, for a planned unicast transmission it will be determined the relative velocity between the transmitting station and the receiving station.

In the case of unicast transmission the transmitting transportation vehicle knows that it communicates only with one partner. This allows the transmitting transportation vehicle (based on sensor-based predictive communication algorithms) to roughly estimate the potential Doppler impact, delay spread and the power relation between all specular channel components which will affect the receiver performance. An Example for sensor-based Doppler prediction and compensation is the following: At the time of desired data transmission, the transmit transportation vehicle based on the available knowledge from its own sensors and the information in cooperative awareness messages evaluates whether the receiving transportation vehicle is in the Line-Of-Sight (LOS), obstructed LOS (oLOS), or in non-LOS (LOS) condition. Then the relative velocity to the communicating partner and the presence of strong specular reflections such as from other transportation vehicles, e.g., trucks in the vicinity and from the presence of large traffic signs is calculated. Note, that the position and motion of the transportation vehicles is regularly exchanged among road participants, e.g., broadcasted in CAM messages. All this is performed in operation at 203.

Then based on the relative and absolute velocity levels, LOS/oLOS/nLOS conditions and the presence of strong specular reflectors, the potential negative impacts on the link performance, such as Doppler impact on the communication process is estimated for the receiving transportation vehicle in operation at 204. This includes the signal travel time calculation for the LOS transmission path and all relevant specular transmission paths based on the known distances to the receiving transportation vehicle and to the specular reflectors which could potentially produce strong specular reflections.

An illustrative example of the possible problem in dynamic V2V cooperative communication for the unicast case is the action of the emergency breaking in the cooperative high density platooning. Here the platoon leader PL needs a unicast confirmation from each platoon transportation vehicle PV1 to PV3 about its ability to reduce the current velocity to the requested by the platoon leader PL. If at the time of unicast transmission the channel quality is being affected by high Doppler spread components or by a strong specular reflection with very high Doppler shift from the passing by transportation vehicle or a traffic sign in the vicinity, the unicast message may be lost and the platoon leader PL will require additional retransmission. Such retransmission may result in an application delay similarly to the described above manner, which in turn may limit such performance parameters of the high density platooning as a minimum distance between platoon members.

After the transmission conditions were estimated, the transmitting transportation vehicle in operation at 205 selects the appropriate data from the transmit buffer in the on-board unit 110. This selection operation takes the result from the transmission condition estimation operation at 204 and uses it as an index for a look-up table to find out which category of data it may select from the transmit buffer. This is because different data may have different susceptibility to transmission errors and different end-to-end latency. In the reference mentioned above from M. Boban et al. an example of different categories of data is presented in table 1. Since the transmission conditions are estimated for a period in the future, too the transmitting station can plan which category of data will be transmitted at what time. When no data is found in the transmit buffer in a category that is susceptible enough against the amount of transmission errors under the estimated transmission conditions, data from the category which fits best to the estimated transmission conditions are selected. In operation at 206 it follows an operation in which it will be checked whether an available equalization, encoding and link adaptation strategy is capable to bring improvement. The data prepared for transmission will be organized in the look-up table with entries for the End-To-End Latency, Reliability corresponding to Error Proneness and required Data Rate. Table 1 below presents an excerpt from the table in the cited reference of M. Boban et al.

TABLE 1

| Use Case Type | End-to-End Latency | Reliability | Data Rate per veh. (kbps) |
|---|---|---|---|
| Cooperative Awareness | 100 ms-1 sec | 90-95% | 5-96 |
| Cooperative Sensing | 3 ms-1 sec | >95% | 5-25000 |
| Cooperative Maneuver | <3 ms-100 ms | >99% | 10-5000 |
| Vulnerable Road User | 100 ms-1 sec | 95% | 5-10 |
| Traffic Efficiency | >1 sec | <90% | 10-2000 |
| Teleoperated Driving | 5-20 ms | >99% | >25000 |

In another disclosed embodiment the table may include further categories of data. It may include particular categories for certain sensor types. E.g., Audio or video data may be less susceptible to transmission errors since there are a plurality of methods existing for error concealment like interpolation techniques. While the table lists the reliability as one search criterion, a tolerance to an error rate may be used as one alternative. The corresponding bit error rate BER values would then be entered in the table.

For more detailed explanation of the sensor-based predictive communication algorithms it is referred to the parallel patent application of the applicant with reference number DE 10 2015 214 968 A1. Typical methodologies of link adaptation are reduction of the code rate, change to a different modulation type, e.g., from 128 QAM to 64 QAM to 32 QAM to 16 QAM to 8 PSK to QPSK to BPSK, puncturing and antenna diversity processing. The effect of this is that the data rate is reduced operation by operation but the reliability is increased operation by operation also.

If due to severe channel conditions no sufficient (the term "sufficient" means the acceptable performance for the given V2V application) improvement is expected, the transmission is being postponed up to the time in the future where the transmission conditions are predicted to be sufficient for such data within the allowed end-to-end latency by the application. The program then loops back to operation at 205.

If the sufficient improvement is expected, the transportation vehicle reconfigures the transmit parameters to minimize the potential negative impact of the channel. One possible example is compensation of the LOS Doppler shift due to high relative velocity between communicating transportation vehicles. Here, the combination of predictive compensation at transmitter and receiver is also possible: e.g., then the receiving transportation vehicle analyzes if any further improvement via sensor-based predictive communication is possible at the transmitter and applies post-equalization of the received signal. One possible example is to conduct a Doppler shift compensation of the strong specular signal component.

Another example is to provide a frequency compensation shift of the group of Doppler spread spectral components, if it was detected at the receiver that the Doppler spread due to surrounding environment has non symmetrical distribution (this is usually the case in V2V communications).

The data will finally be transmitted in operaton at 207.

For the data that has been postponed in operation at 206, it will be checked in operation at 208 if such data in the transmit buffer violates the required end-to-end latency. If yes, it will be deleted from the transmit buffer in operation at 209. If not, the program directly ends in operation at 210 without performing operation at 209.

In an alternative disclosed embodiment, the data will not just be postponed but it will be processed before being transmitted, too. A postponement may be included in this operation, too. One example for this solution is the transmission of sensor data for the use case of cooperative sensing. If the transmission of the sensor raw data is not possible, due to the transmission conditions, such data will be processed before transmission. By this processing operation the amount of data to be transmitted may be reduced. On the other hand the data may be secured by using additional error protecting or error correcting codes.

In the typical multicast or broadcast communication the transmitted message is intended to many communicating partners in the vicinity. This leads to the problem that some of the receiving partners may be not known to the transmitting transportation vehicle. Even if the information about other communication partners is available at the transmitter, it will still be a very challenging task to adapt the transmit signal to all possible receiving transportation vehicles simultaneously, since the range of such adaptation is determined by the physical properties of the transmission channel (e.g., number of transmit antennas, size of the precoding matrix, etc.). Due to this, the typical sensor-based predictive communication technique may not be possible at the transmitter for transmissions in multicast or broadcast communication modes.

An illustrative example of the possible problem in dynamic V2V cooperative communication for the broadcast case is an impact of time and space varying channel on the received broadcast message by the transportation vehicles involved in cooperative collision avoidance maneuver. Here, due to differences in relative distances and velocities between the sender and all receiving transportation vehicles, the corresponding error rate for each link will be significantly different from each other. Some transportation vehicles may be able to receive the notification of collision alarm without any data packet loss whereas others may not receive this notification even after multiple retransmissions. The absence of function-relevant information at some transportation vehicles which are directly involved in the collision avoidance process may even result in a complete failure of the collision avoidance application. Nevertheless, it is one approach to use the same process as shown in FIG. 4 also for the broadcast transmission mode. Of course, the operation at 204 of estimating the transmission conditions is much more demanding since the transmission conditions for multiple links need to be estimated. The worst conditions may be taken for the further process then.

Figure 5:
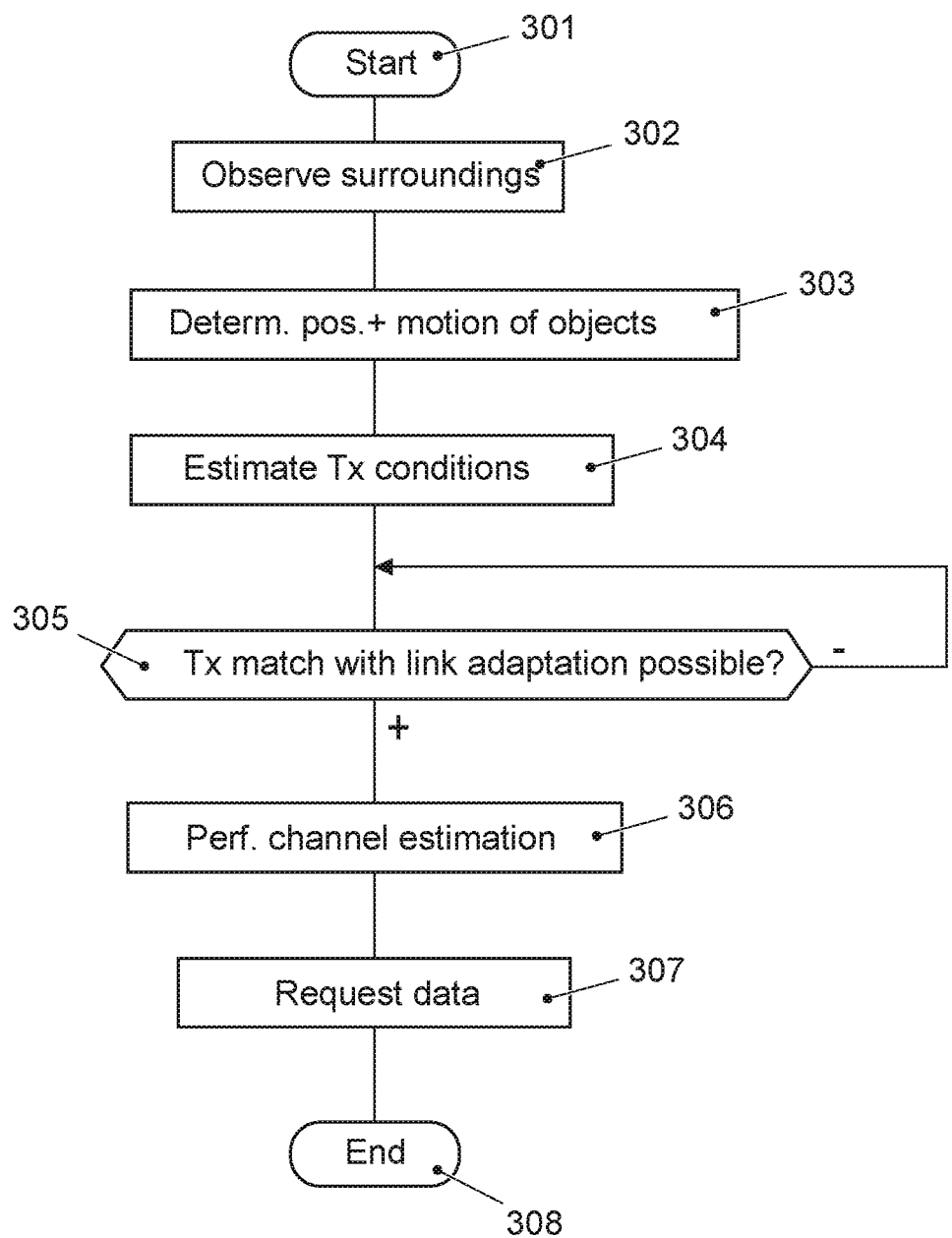
FIG. 5 shows a flow chart of a computer program to be executed in a processing unit of a V2V receiving participant.

In another disclosed embodiment, the predictive Doppler compensation will be done at the receiving participant, since for the receiving participant the multicast transmission is seen as a unicast link. Then in this case, the predictive communication has to be conducted at the receiver, i.e., the receiver needs to inform the transmitting station when the corresponding data should be send. Such process is depicted with a flow chart for a corresponding program in FIG. 5. The program starts in operation at 301. In operation at 302 the corresponding operation to operation at 202 of FIG. 4 is performed for observing the surroundings of the transportation vehicle. Operation at 303 corresponds to operation at 203 where position and motion of the objects is determined. In operation at 304 the corresponding operation to operation at 206 in FIG. 4 is performed. Operation at 305 corresponds to operation at 204 in FIG. 4 where an operation of estimating the transmission conditions is performed. For a selected category of data the receiving station awaits from a transmitting station it will be checked if with link adaptation the estimated transmission conditions could be improved such that such type of data could be delivered. If yes, the link adaptation will be executed. This concerns, e.g., the selection of the DMRS mode as explained above in one example. The receiver needs to request this link adaptation at the transmitter. Operation at 306 corresponds to an operation of channel estimation for sending back such feedback information to the transmitter. This is executed in the usual manner by utilizing the DMRS symbols of the current DMRS mode. In operation at 307 the receiving station requests the DMRS mode which is appropriate for the transmission conditions determined in operation at 305, i.e., it sends a corresponding message to the transmitter. In another disclosed embodiment the receiver in operation at 307 also informs the transmitter at what time such data should be sent and such DMRS mode should be used. The transmission time had also been determined in the transmission condition estimation operation at 305. Operation at 307 therefore corresponds to a feedback loop from the receiver to the transmitter. The program ends in operation at 308.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to, and executed by, a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments which are also considered to belong to the disclosure.

REFERENCE SIGN LIST

10 Internet
20 Base Station
30 Transportation vehicle
40 Evolved Packet Core EPC
50 Traffic Control Center Computer
100 Block Diagram Car Communication
102 High-speed CAN-Bus
105 Camera
104 CAN-Bus
108 Ethernet-Bus
110 On-Board Unit
120 Navigation System
140 Gateway
151 Engine Control Unit
152 ESC-Control Unit
153 Transmission Control Unit
161 Sensor 1
162 Sensor 2
163 Sensor 3
171 Driver Assist Control Unit
172 UWB Transceiver
173 UWB Transceiver
1712 UWB Ranging Scheduling Unit
201-210 Transmitter Program Operations
301-308 Receiver Program Operations

The invention claimed is:

1. A control unit which performs a method for data communication between at least two participants of a wireless communication system, the method comprising:
    observing surroundings of a transmitting participant included in the at least two participants;
    determining position and motion of the at least two participants;
    estimating transmission conditions for a later point in time, wherein data ready for data communication stored in a transmit buffer of a participant is classified in different categories, the categories based on susceptibility of the data to transmission errors;
    selecting the category of data for data transmission from the transmit buffer at a given point in time for which the transmission conditions have been estimated based on the estimated transmission conditions so the data to be transmitted is in a category that fits the estimated transmission conditions, wherein in response to no data being found in the transmit buffer in a category that is susceptible enough against the amount of transmission errors under the estimated transmission conditions, a category of data which fits best to the estimated transmission conditions is selected;
    checking whether the transmission conditions are improved by link adaptation at the transmitting station; and
    transmitting the selected data according to the link adaptation.

2. A transportation vehicle equipped with a control unit which performs a method for data communication between at least two participants of a wireless communication system, observing surroundings of a transmitting participant included in the at least two participants;
    determining position and motion of the at least two participants;
    estimating transmission conditions for a later point in time, wherein data ready for data communication stored in a transmit buffer of a participant is classified in different categories, the categories based on susceptibility of the data to transmission errors;
    selecting the category of data for data transmission from the transmit buffer at a given point in time for which the transmission conditions have been estimated based on the estimated transmission conditions so the data to be transmitted is in a category that fits the estimated transmission conditions, wherein in response to no data being found in the transmit buffer in a category that is susceptible enough against the amount of transmission errors under the estimated transmission conditions, a category of data which fits best to the estimated transmission conditions is selected;
    checking whether the transmission conditions are improved by link adaptation at the transmitting station; and
    transmitting the selected data according to the link adaptation.

3. A computer program comprising program operations which perform a method for data communication between at least two participants of a wireless communication system when the method is run in a computer, observing surroundings of a transmitting participant included in the at least two participants;
    determining position and motion of the at least two participants;
    estimating transmission conditions for a later point in time, wherein data ready for data communication stored in a transmit buffer of a participant is classified in different categories, the categories based on susceptibility of the data to transmission errors;
    selecting the category of data for data transmission from the transmit buffer at a given point in time for which the transmission conditions have been estimated based on the estimated transmission conditions so the data to be transmitted is in a category that fits the estimated transmission conditions, wherein in response to no data being found in the transmit buffer in a category that is susceptible enough against the amount of transmission errors under the estimated transmission conditions, a category of data which fits best to the estimated transmission conditions is selected;
    checking whether the transmission conditions are improved by link adaptation at the transmitting station; and
    transmitting the selected data according to the link adaptation.

4. A method for data communication between at least two participants of a wireless communication system, the method comprising:
    observing surroundings of a transmitting participant included in the at least two participants;
    determining position and motion of the at least two participants;
    estimating transmission conditions for a later point in time, wherein data ready for data communication stored in a transmit buffer of a participant is classified in different categories, the categories based on susceptibility of the data to transmission errors;
    selecting the category of data for data transmission from the transmit buffer at a given point in time for which the transmission conditions have been estimated based on the estimated transmission conditions so the data to be transmitted is in a category that fits the estimated transmission conditions, wherein in response to no data being found in the transmit buffer in a category that is susceptible enough against the amount of transmission errors under the estimated transmission conditions, a category of data which fits best to the estimated transmission conditions is selected;
    checking whether the transmission conditions are improved by link adaptation at the transmitting station; and
    transmitting the selected data according to the link adaptation.

5. The method of claim 4, wherein estimating the transmission conditions comprises estimating whether the receiving participant is in line of sight to the transmitting participant, in obstructed line of sight or in non-line of sight to the transmitting participant.

6. The method of claim 4, wherein estimating the transmission conditions comprises at least one of:
    estimating the relative velocity between at least two participants;
    estimating at least one of the Doppler frequency shift, delay spread, the power relation of signal reflections from objects in the surroundings of the transmitting participant; and
    estimating the signal travel time for at least the line of sight transmissions between at least two participants.

7. The method of claim 6, wherein the signal travel time is estimated for relevant signal reflections reaching the receiving participant.

8. The method of claim 4, wherein the data ready for transmission is organized in a look-up table in a transmit buffer, the look-up table listing the data ready for transmission in the categories.

9. The method of claim 4, wherein link adaptation comprises at least one of the techniques hybrid automatic repeat request, transmit power control, modulation type adaptation, puncturing and antenna diversity processing.

10. The method of claim 4, further comprising checking whether the transmission conditions are improved by link adaptation at the receiving station.

11. The method of claim 10, wherein link adaptation comprises at least one of the techniques Doppler compensation and antenna diversity processing, wherein for the technique of Doppler compensation the receiving station sends a feedback message to the transmitting station with which the transmitting station is informed about the type of link adaptation to be performed and the time at which this link adaptation is performed.

12. The method of claim 4, wherein at least the categories unicast acknowledgement message and broadcast alarm message from the field of cooperative or autonomous driving are distinguished for categorizing data.

13. The method of claim 4, wherein the checking whether the transmission conditions are improved by link adaptation includes determining whether the data to be transmitted in a given category fits to the transmission conditions, and wherein, in response to determining that the transmission conditions are rougher than what is appropriate for the given category, the data transmission is postponed and a data transmission with data in a category with lower susceptibility to rough transmission conditions is advanced.

14. The method of claim 13, wherein the postponement of the data amounts the time where estimating the transmission conditions better transmission conditions are predicted.

15. The method of claim 14, wherein the maximum allowed latency of the data in the respective category is also assigned for categorizing data.

16. The method of claim 15, wherein, in the checking whether the transmission conditions are improved, a maximum allowed postponement of the data corresponds to the maximum allowed latency of the data in the given category.

\* \* \* \* \*